United States Patent [19]
Harrison et al.

[11] Patent Number: 6,104,978
[45] Date of Patent: Aug. 15, 2000

[54] GPS-BASED CENTRALIZED TRACKING SYSTEM WITH REDUCED ENERGY CONSUMPTION

[75] Inventors: Daniel David Harrison, Delanson; Kenneth Brakeley Welles, II, Scotia, both of N.Y.

[73] Assignee: General Electric Company, Schenectady, N.Y.

[21] Appl. No.: 09/055,336

[22] Filed: Apr. 6, 1998

[51] Int. Cl.[7] .............................. H04B 7/185; G01S 5/02
[52] U.S. Cl. ..................... 701/207; 701/213; 701/214; 342/457
[58] Field of Search ................................. 701/207, 213, 701/214, 215, 216, 223, 210; 342/357, 457; 340/992, 989; 470/316

[56] References Cited

U.S. PATENT DOCUMENTS

| | | | |
|---|---|---|---|
| 5,663,735 | 9/1997 | Eshenbach | 342/357 |
| 5,682,139 | 10/1997 | Pradeep et al. | 340/539 |
| 5,691,980 | 11/1997 | Welles, II et al. | 370/316 |
| 5,752,218 | 5/1998 | Harrison et al. | 701/207 |
| 5,883,594 | 3/1999 | Lau | 342/357 |

*Primary Examiner*—Tan Nguyen
*Attorney, Agent, or Firm*—Marvin Snyder; Douglas E. Stoner

[57] ABSTRACT

A communication method reduces both the asset energy requirements and communication channel occupancy in a reduced order GPS asset tracking system. The asset is provided with an indication of its position so as to allow detection of substantial movement of the asset at the asset. Reduced order GPS data derived at the asset, such as a railcar, is compressed to allow for shorter railcar data transmission times. This, in turn, reduces both the transmitter energy requirements and communication-channel occupancy, while allowing substantial railcar position changes to be conveniently detected at the railcar. This capability can be used to save further substantial railcar energy by, for example, reporting to the central station less frequently when the railcar position is unchanging.

12 Claims, 6 Drawing Sheets

GPS-BASED CENTRALIZED TRACKING SYSTEM WITH REDUCED ENERGY CONSUMPTION

CROSS-REFERENCE TO RELATED APPLICATION

This application discloses subject matter related to that of D. D. Harrison et al. commonly assigned, allowed application Ser. No. 08/924,478, filed Aug. 25, 1997, a continuation of abandoned application Ser. No. 08/456,229 filed May 31, 1995, for "A Reduced-Power GPS-Based System for Tracking Multiple Objects from a Central Location" now U.S. Pat. No. 5,752,218. The disclosure of application Ser. No. 08/924,478 is incorporated herein by reference.

BACKGROUND OF THE INVENTION

This invention relates to Global Positioning System (GPS) asset tracking systems and, more particularly, to a method of reducing energy consumed by, and data transmitted from, tracked units in a centralized asset tracking system.

The tracking and location of assets such as railcars, shipping or cargo containers, trucks, truck trailers, automobiles, etc., can be highly advantageous in commerce. Precise tracking of such vehicles and objects can facilitate their being efficiently allocated and positioned, and can provide for immediate, accurate localization of lost, delayed or damaged assets. The space-based global positioning system (GPS), implemented by the United States Department of Defense, constitutes a convenient instrumentality for determining geographical position in real time.

The GPS is a multiple-satellite-based radio-positioning system. Each GPS satellite transmits data to be used by a receiver to measure its distance from the GPS satellite. The signals from several satellites allow the receiver to compute its position, velocity and time parameters through known triangulation techniques. The signals provided by the GPS can be received globally and continuously.

The space segment consists of 21 operational satellites and three spare satellites. The satellites are positioned in a constellation such that typically seven satellites, but a minimum of four, are observable by a user anywhere on or near the earth's surface. Each satellite transmits signals on two frequencies known as L1 (1575.42 MHz) and L2 (1227.6 MHz), using direct-sequence spread spectrum techniques. A system with two tiers of position accuracy is provided by employing both coarse and precise spreading codes. These codes contain the timing information needed for determining the range from a satellite to the user. Both C/A (coarse/acquisition) and P (precise) pseudo-random noise (PRN) codes are transmitted on frequency L1, and only the P code is transmitted on frequency L2. The C/A is available to any user, military or civilian, but the P code is usually available only to authorized military and civilian users.

Superimposed on both the P and C/A codes is a 50 bit/second navigation (NAV) data stream that is unique for each satellite. Each NAV data stream is a continuous sequence of 30-second message frames, organized as a sequence of five 6-second sub-frames. Each sub-frame begins with a synchronization sequence called the telemetry-word preamble (TWP). This is followed by a hand-over word (HOW) that indicates GPS time at the beginning of the next sub-frame, and facilitates the transition from C/A to P code tracking. Each frame includes accurate ephemeris data that describes the satellite's position as a function of time, and clock-correction data for that satellite. Spread over 25 adjacent frames is the GPS almanac data for the entire constellation of GPS satellites. The almanac data includes approximate ephemeris data, satellite health status, coefficients for the ionospheric delay model for C/A code users, and coefficients used to calculate universal coordinated time (UCT).

The control segment comprises a master control station (MCS) and a number of monitor stations. The monitor stations track all GPS satellites, collecting ranging data and satellite clock data from each satellite. This information is passed on to the MCS where the satellite's future ephemeris and clock drift are predicted and, sometimes, corrected. The purpose of the control segment is to ensure that the information transmitted from the satellites is as accurate as possible.

The GPS is intended to be used in a wide variety of applications including space, air, sea and land vehicle navigation, precise positioning, time transfer, altitude referencing and surveying. A typical GPS receiver comprises a number of subsystems, including an antenna assembly, an RF (radio frequency) assembly, and a GPS processor assembly. The antenna assembly receives the L-band GPS signal and amplifies it prior to insertion into the RF assembly. A significant factor affecting accuracy of the computed position, velocity or time parameters is the positional geometry of the satellite selected for measurement of ranges. Generally, a best position solution is obtained using satellites having wide angles of separation. Considerable emphasis has therefore been placed on designing antenna systems to receive, with uniform gain, signals from any point on the hemisphere.

In a typical GPS receiver, the RF assembly mixes the L-band GPS signal down to a convenient IF (intermediate frequency) signal. Using various known techniques, the PRN code modulating the L-band signal is tracked through code-correlation at the receiver. This provides the processing gain needed to achieve a signal-to-noise ratio (SNR) sufficient for demodulating the navigation data. The Doppler shift of the received L-band signal is also measured through a carrier tracking loop. The code correlation and carrier tracking function can be performed using either analog or digital signal processing.

A typical GPS receiver receives and process signals from several of the GPS satellites in order to determine range to (and relative velocity of) each satellite. With perfect knowledge of range to only three of the GPS satellites, exact receiver position can be determined from the intersection of the three "spheres" induced by the known satellite positions and the derived receiver ranges. With receiver noise and imperfect knowledge of satellite positions, the receiver-satellite ranges can only be estimated. Typically, errors from receiver noise are reduced by (effectively) averaging many range calculations. The pseudo range from a particular satellite is calculated by reading the transmission time (time stamp) associated with the sub-frame time marker in the satellite's data stream, subtracting this time from the reception time of the time marker (as indicated by the receiver time clock), and multiplying the difference by the speed of light. Error in the receiver clock leads to proportional pseudo-range errors. Because the same clock is used in receiving from all satellites, the same clock error is involved in all pseudo-range measurements. By measuring the pseudo-range from four or more satellites, the clock error (bias) and ranges can be jointly estimated.

At the receiver, the reception time of the time marker (or of any NAV data-bit edge) is determined by performing a cross-correlation of the received signal with a local replica of the known satellite PRN code, and noting the receiver time of the cross-correlation peak associated with the marker. The satellite signal structures use Code Division Multiple Access (CDMA) so that the above cross correlation is part of the standard GPS receiver processing. A description of CDMA techniques may be found, for example, in *CDMA Principles of Spread Spectrum Communication*, by Andrew J. Viterbi, Addison-Wesley (1995).

A typical GPS receiver must determine its own position. This requires that the GPS time stamp, satellite ephemeris, and other NAV data be decoded from each satellite's data stream at the tracked object. The receiver is thus required to process data from each satellite long enough (between six and 150 seconds) to synchronize with, and decode, these data. This consumes significant energy.

The system of the invention includes a central station that needs the receiver positions and can communicate with the receivers. Each tracked object (e.g., a railcar) carries a GPS-based receiver that processes the signal from several of the visible GPS satellites. However, normal GPS processing is not performed at the railcar; instead, only partial processing is done at the railcar and intermediate results are transmitted to the central station. The forms of both the partial processing and intermediate results are chosen to reduce the complexity and energy requirements at the railcars.

U.S. Pat. No. 5,225,842 describes an apparatus and method for computing the position and velocity of multiple low cost vehicle-mounted sensors that are monitored and tracked by a central control station. The receiver processor functions are physically separated from the navigation functions, and a low rate data interface is provided between the computers that perform these functions. This achieves a cost reduction in the GPS sensor that is employed on board each vehicle. However, substantial reduction of energy use at the tracked object is not achieved. Application Ser. No. 08/924,478 cited above, discloses a Reduced Order GPS (ROGPS) system that substantially reduces the energy requirements on tracked railcars. This reduction is accomplished by deriving ROGPS data from the received GPS signals at the railcar and sending these data to the central station for processing. The ROGPS data require less GPS receiver and processor operating time than does conventional GPS data reception; however, the ROGPS data set is larger than that generated by a normal GPS receiver, and hence more data must be communicated to the central station. This increases the communication channel occupancy and transmitter energy consumed. Furthermore, the ROGPS data give no indication of position to the tracked object.

It would be advantageous to have an improved ROGPS system that retains the very short receiver operation time on average, while generating a reduced data set for communication to the central station. It would also be advantageous to have the generated data give an indication of position to the tracked object.

SUMMARY OF THE INVENTION

The present invention provides reductions in both the asset energy requirements and communication channel occupancy in a Reduced Order GPS asset tracking system. The invention also provides the asset, such as a railcar, with an indication of its position so as to allow detection of substantial railcar movement at the railcar. This is accomplished by compressing reduced order GPS data derived at the railcar, to allow for shorter railcar data transmission times. This, in turn, reduces both the transmitter energy and communication-channel occupancy. Furthermore, the capability of detecting substantial railcar position changes at the railcar can be used to save further substantial railcar energy by, for example, reporting to the central station less frequently when the railcar position is unchanging.

DETAILED DESCRIPTION OF A PREFERRED EMBODIMENT OF THE INVENTION

Figure 1:
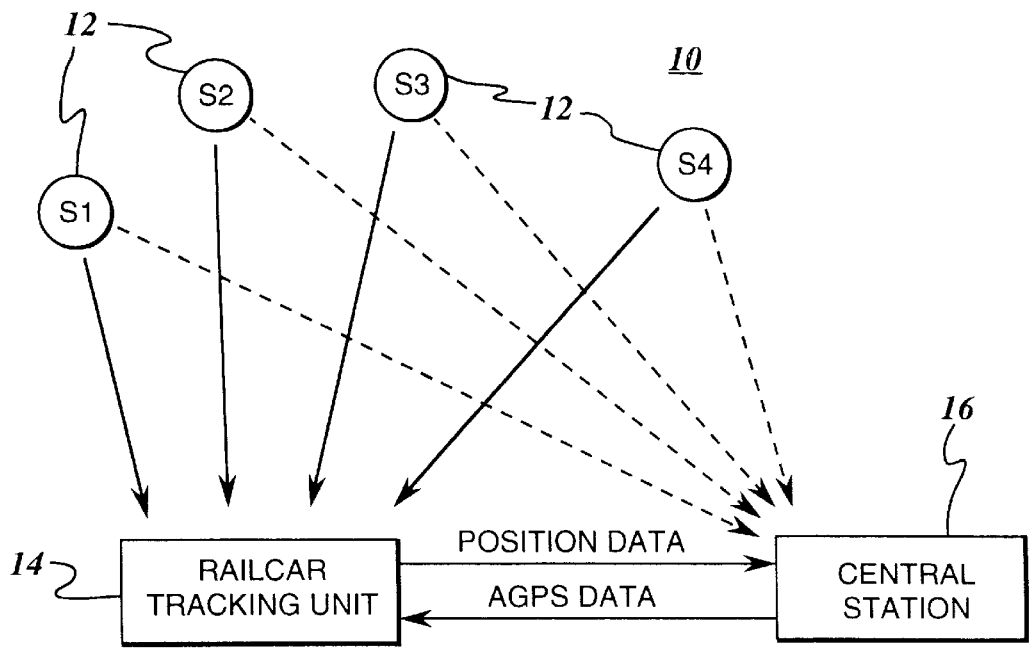
FIG. 1 is a block diagram of a remote tracking system in accordance with the present invention.

FIG. 1 illustrates a plurality of GPS satellites 12, an object being tracked (asset), such as a railcar, carrying a tracking unit 14, and a central station 16. It is desired that the central station accurately monitor position (and, possibly, velocity) for each tracked object. Each satellite 12 transmits a signal that a GPS receiver in tracking unit 14 can use to derive information about its own position (and velocity). The signals include NAV data that describe non-asset related information such as satellite trajectories, etc. GPS receivers in tracking units 14 receive and process the satellite signals to calculate approximate railcar positions. The approximate railcar positions are sent to central station 16. GPS receivers in tracking units 14 are modified from the conventional GPS receiver in that only approximate railcar positions are calculated at the railcar. Furthermore, the necessary NAV data are collected less frequently. This allows considerable energy savings at the railcar. Central station 16 also receives the satellite signals used at the railcars and can collect all NAV data. Using information received directly from the satellites, the central station 16 corrects the approximate railcar positions received from the railcar tracking units.

Figure 2:
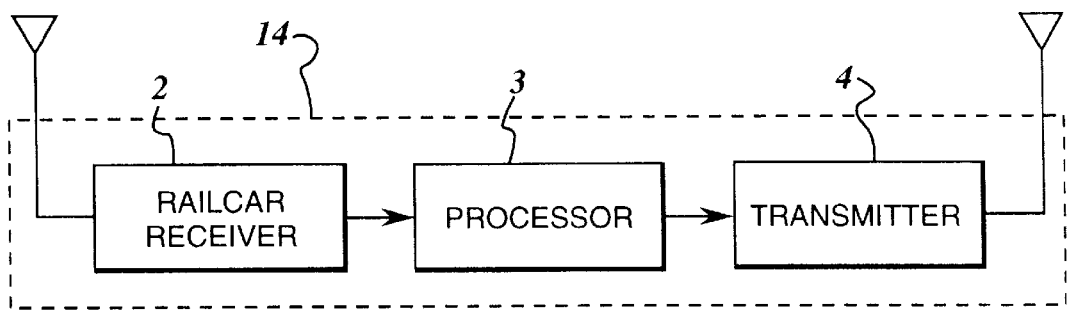
FIGS. 2 and 3 are block diagrams of a tracking unit on an object to be tracked, and of a central station, respectively, in accordance with the invention.

As shown in FIG. 2, railcar tracking unit 14 comprises a receiver 2 responsive to the signals from GPS satellites 12, a processor 3, and a transmitter 4. For each desired railcar localization (fix), processor 3 measures transmission-time differences between several GPS satellites 12. Processor 3 then uses these transmission-time differences together with occasionally updated auxiliary GPS (AGPS) system data to calculate an approximate railcar position. The approximate position is then sent to central station 16 via transmitter 4.

Figure 3:
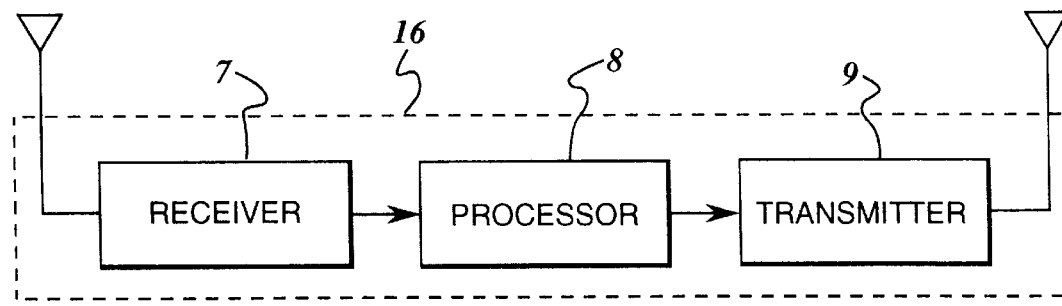

As shown in FIG. 3, central station 16 comprises a receiver 7, a processor 8, and a transmitter 9. Receiver 7 is responsive to signals from railcar tracking units 14 and to signals from GPS satellites 12. Processor 8 uses data from the GPS satellites 12 with the approximate railcar positions from railcar tracking units 14 to calculate accurate railcar positions. Processor 8 also develops auxiliary GPS data from signals from GPS satellites 12. Transmitter 9 broadcasts the auxiliary GPS data to the railcar tracking units.

The accurate ephemeris and other GPS satellite (space-segment) parameters are described within the NAV data. The GPS MCS (not shown) monitors the satellite trajectories, clocks, and general health, and generates updated satellite parameters at approximately hourly intervals. These updates are reflected in changes to the NAV data transmitted from the satellites. To insure accurate calculated positions, any GPS based tracking system must use accurate ephemeris data that is no more than about four hours old. If the asset positions are to be monitored more frequently than every four hours, then new accurate ephemeris data must be collected at least every four hours. Collection of accurate ephemeris data at the railcar tracking unit typically takes at least one minute so that accurate ephemeris maintenance requires an approximate minimum of 15 seconds of receiver operation per hour. This is a significant energy expense if done at each railcar.

The GPS satellite trajectories are nearly periodic and are approximated with approximate ephemeris equations. Parameters that specify the approximate ephemeris equations are included in each satellites' NAV data stream. The MCS monitors the orbits, periodically updates the approximate ephemeris parameters (part of the GPS almanac), and uploads them to the satellites for continuous transmission in each satellites' NAV data stream. Once received by a user, the approximate ephemeris remains valid for several weeks, depending on the accuracy desired. For example, within one day of the center of a validity time window, the approximate ephemeris equations yield satellite position error (one standard deviation) of about 1000 meters. Within one week, the number grows to 2500 meters, and at two weeks the number is 5000 meters (Van Dierendonck, "The GPS Navigation Message," pp. 55 in *Global Position System Papers*, volume 1, Institute of Navigation, 1980). A standard GPS receiver typically uses the approximate ephemeris only for determining satellite visibility (in order to identify which satellites to look for) and derives accurate satellite positions from the accurate ephemeris data included in the NAV data stream.

In one aspect of the invention, reception and demodulation of the accurate ephemeris is avoided at the railcar tracking unit. Instead, the approximate ephemeris is received and used to calculate approximate railcar positions. Moreover, it is received approximately once every two weeks. Reception of the approximate ephemeris takes about 13 minutes (if received via the GPS signals) so that approximate ephemeris maintenance requires an average receiver operation time of about 2.5 seconds per hour. This is significantly less energy than the 15 seconds required for accurate ephemeris maintenance.

This invention substantially preserves the energy advantages described in application Ser. No. 08/924,478 cited above, since a railcar fix usually requires that the railcar GPS receiver be energized only long enough to recognize a 4-bit NAV-data sequence. Furthermore, this invention improves upon the invention in application Ser. No. 08/924,478 by providing railcar tracking units with access to auxiliary GPS (AGPS) system data. These data allow an inexpensive railcar clock to be kept in approximate synchronization with GPS time and allow approximate railcar position to be calculated at the railcar. An important reason for calculating railcar position at the railcar is that a series of such positions is compressible due to the limited railcar speed. With limited railcar speed, the relative railcar position (change in absolute position between time-adjacent measurements) is kept small and can be communicated to the central station with fewer bits than needed for specifying absolute railcar position. However, when measured transmission-time differences are sent to the central station, such transmission-time differences depend on both satellite and railcar positions, and the satellite positions change rapidly and dramatically. This de-correlates time-adjacent transmission-time difference measurements, making them less compressible.

In another aspect of the invention, the approximate relative railcar position is most often transmitted to the central station. Occasionally, the approximate absolute position is transmitted to keep any accumulating measurement and/or channel-induced errors from growing too large. When the absolute or relative position is transmitted, it can be compressed by using fewer bits to encode the elevation component than is used for the horizontal components because tracked objects are typically vertically constrained to be within a few miles of sea level. By using such compression, railcar energy use and communication-channel occupancy are reduced.

At each railcar, the AGPS data can include the approximate ephemeris for all satellites, as well as other system data such as GPS-signal frame-time offsets. With a perfect GPS system, all transmitted satellite signals would be in synchronism: corresponding NAV data frames from the different satellites would all start at exactly the same time, the sub-frame rates would be exactly 6 seconds, and frame 0 (the first frame) would start exactly at the beginning of the week. In practice, perfect synchronization is not maintained; i.e., there is some offset of frame 0 from the beginning of the week. However, the MCS controls the satellites to keep this frame-time offset small, maintaining the magnitude of all frame-time offsets below 1.0 millisecond (Van Dierendonck et. al., *Global Positioning System*, volume 1, pp. 72, Institute of Navigation, 1980).

Figure 4:
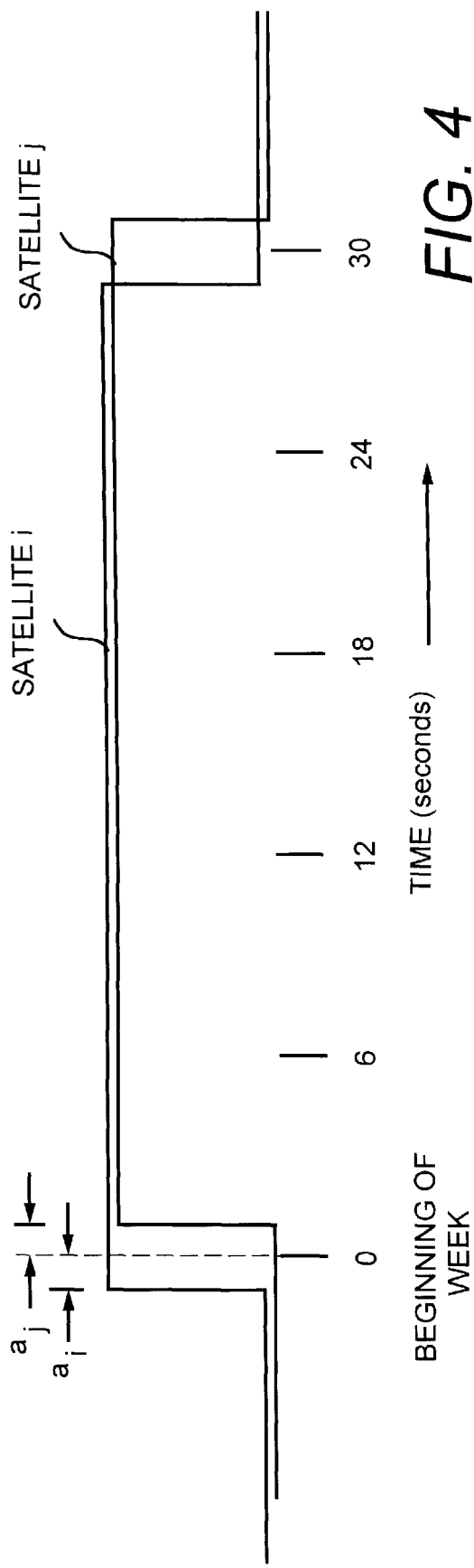
FIG. 4 is a timing diagram illustrating transmission frame-time offsets for two GPS signals.

FIG. 4 illustrates transmission frame-time offsets $a_i$ and $a_j$ for corresponding frames from satellites i and j, respectively, relative to the six-second sub-frame grid aligned with the beginning of the week. In another method of the invention, these offsets are accounted for at the railcar tracking unit. These offsets change very slowly and can therefore be stored in the AGPS data base and be updated only occasionally. The AGPS data can be derived from the GPS signals through direct reception, or received from the central station via a broadcast channel. In the latter case, the AGPS data are first derived at the central station from standard GPS receivers to which the central station has access (e.g., the GPS receiver may be at the central station or at a controlled remote site). The use of a broadcast channel has advantage over direct GPS reception because the GPS data rate is fixed and low. With a higher rate broadcast channel, less railcar receiver time and energy is needed for AGPS data reception.

In another aspect of the invention, approximate railcar position is calculated at the railcar tracking unit using the measured transmission-time differences with the frame-time offsets and approximate satellite ephemerides available from the AGPS data stored at the railcar. The approximate railcar positions are sent to the central station and corrected there, using both the approximate and accurate satellite ephemerides. Corrections are performed at the central station by first re-deriving the measured transmission-time differences from the received approximate position, and then calculating an accurate position using these time differences together with accurate satellite ephemerides. The goal is to get an approximate position at the railcar that 1) is accurate enough to be useful for detection of substantial movement at the railcar,
2) can be significantly compressed in concert with other measurements in a report or between reports sent to the central station, and
3) can be used at the central station to determine an accurate railcar location.

Approximate railcar position can be determined at the railcar tracking unit from propagation-time differences between four satellites' signals received at the railcar. The propagation-time difference between signals from satellites i and j is defined as $$\Delta_{ij} = \tau_j - \tau_i, \quad (1)$$

where $\tau_i$ is the signal propagation time from satellite i to the railcar. The propagation-time differences are not directly measured at the receiver but are calculated from measured transmission-time differences, as described later. The satellite-railcar ranges and propagation-time differences are related by the equations $$R_i(t, t-\tau_i) - R_1(t, t-\tau_1) = c\Delta_{1i} \quad (2)$$

for i=2, 3, and 4. The satellite indexing is arbitrary, but the signal from satellite 1 will be referred to as the reference signal and the associated satellite will be referred to as the reference satellite. In equation (2), t is the common time at which the signals are measured at the receiver, and c is the speed of light. Also, $R_i(t, t-\tau_i)$ is the range (distance) from satellite i at time $t-\tau_i$ to the railcar at time t and is given by $$R_i(t, t-\tau_i) = \{(x(t)-x_i(t-\tau_i))^2 + (y(t)-y_i(t-\tau_i))^2 + (z(t)-z_i(t-\tau_i))^2\}^{1/2} \quad (3)$$

Here $x_i$, $y_i$, and $z_i$ are time-dependent coordinates for satellite i and are specified by the satellite's approximate ephemeris equations stored in the AGPS data base at the railcar. Also, x(t), y(t), and z(t) are the railcar coordinates at time t.

If a GPS signal from satellite i is received at the railcar tracking unit at time $t=t_R$, then it was transmitted at time $$t_i^T = t_R - \tau_i. \quad (4)$$

In the preferred method, the signal measurement time, $t_R$, is identical for all four satellite signals. However, different measurement times could be used for each satellite and the inter-measurement delays accounted for, as will be understood by those skilled in the art. Identical measurement times can be achieved for all satellite signals by simultaneously using a separate GPS signal processor for each satellite signal. Alternatively, a sufficient segment of the receiver output signal can be stored in a memory so that time $t_R$ is associated with a specific position in the memory. One GPS processor can then read and process the stored signal once for each desired satellite signal.

The transmission times associated with common reception time $t=t_R$ are related by $$t_i^T = t_1^T - \Delta_{1i}, \quad (5)$$

and the satellite-railcar propagation times are related by $$\tau_i = \tau_1 + \Delta_{1i}. \quad (6)$$

From equations (3), (5), and (6), equations (2) can be rewritten as $$R_i(x,y,z,t_1^T-\Delta_{1i}) - R_1(x,y,z,t_1^T) = c\Delta_{1i}, \quad (7)$$

for i=2, 3, and 4. Here x, y, and z are the railcar coordinates at the measurement time and are the only "unknowns". As described later, both the $\Delta_{1i}$ and an approximate value for $t_1^T$ are known at the railcar tracking unit because they are derived from measurements there. The approximate transmission time for satellite 1 is needed in equations (7) to determine the approximate satellite locations. The propagation-time differences in equations (7) do not have to be calculated with reference to satellite 1; i.e., any satellite pairing will be satisfactory as long as the three equations (7) utilize unique pairings.

Equations (7) comprise a set of simultaneous non-linear equations that are readily solved using iterative methods. One such method is the prediction-correction method. With this method, an initial estimate of the railcar position (x, y, z) is made (a recent prior position could be used). This is then used in equations (7), with the known approximate transmission time of satellite 1, to calculate values for $\Delta_{1i}$. These calculated propagation-time differences are compared to the measured propagation differences (derived from measured transmission-time differences) and the error is used to drive the estimated railcar position toward the correct value. New propagation-time differences are then calculated using the updated railcar position. This iteration is continued until a stopping criteria is met; e.g., when there is little difference between the calculated and measured propagation-time differences. Alternatively, the iteration process could be stopped after a predetermined number of iterations. The mathematical details of this iteration are straightforward and known to those skilled in the art. Convergence to the correct value for the approximate railcar position is assured if the initial position is not far away. Simulations show the algorithm to be well behaved.

Cross Correlation

Figure 5:
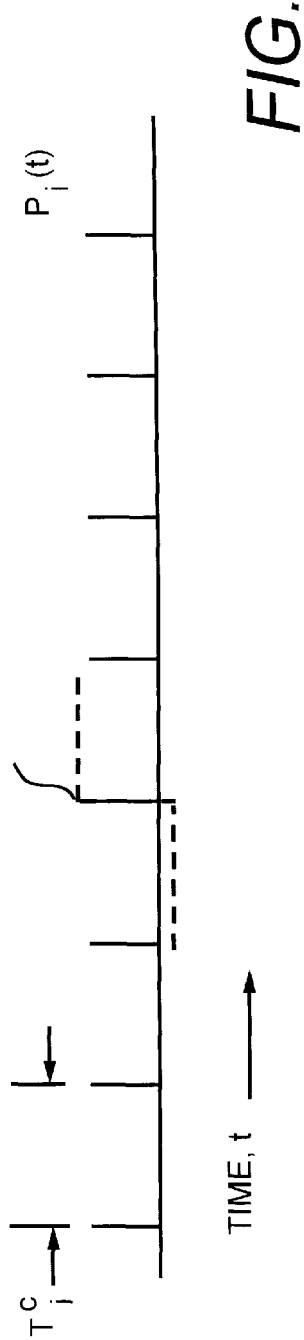
FIG. 5 is a timing diagram illustrating a railcar tracking unit cross-correlator output signal.

The satellite-railcar propagation-time differences needed in equations (7) are determined from transmission-time differences measured at the railcar tracking unit. The timing of a received GPS signal can be determined by cross-correlating the received signal with a locally generated (and appropriately frequency shifted) replica of the PRN code sequence. FIG. 5 shows an exemplary railcar receiver cross-correlator output signal defined as $$P_i(t) = \int_{\tau=0}^{T_i^C} S(t+\tau)r(\tau), \quad (8)$$

for the case where the signal is relatively noise free and the PRN code is the periodically repeating C/A code. Here s(t) is the signal received at the railcar tracking unit, r(t) is the locally generated code replica, and $T_i^c$ is the observed period of the repeating code. Each correlation-peak location marks the beginning of a new cycle of the periodically repeating PRN code for the chosen satellite. Each code cycle is 1.0 ms long (neglecting the small Doppler compression or expansion) and comprises 1023 binary code "chips". There are 20 code cycles during each encoded NAV data bit. FIG. 4 also illustrates, by a dotted line, a typical bit-boundary position.

Marker Phase, Doppler, Propagation Differences

To determine, at a railcar, the propagation-time difference between two satellite signals received at the railcar tracking unit, it is assumed that, for each satellite signal, the Doppler shift is constant locally, i.e., that the satellite-railcar propagation delay changes linearly with time. With this assumption, periodic events in each transmitted waveform remain periodic in the received waveform. A particular set of periodic events is selected for use as markers in each satellite signal. Code-cycle edges and NAV data-bit edges make useful markers with transmitted marker (repetition) periods of 1 and 20 ms, respectively. Use of the same marker type for all satellite signals conveniently allows markers from different satellites to share the same transmitted repetition period $T^M$ (except for negligible differences due to imperfectly synchronized GPS satellite clocks). Markers in the signal received from satellite i will have a marker period $T_i^M$ that is typically different from $T^M$ due to Doppler effects. With the signal received from satellite i, measurement time $t_R$ will fall within marker period $m_i$ and have a specific period-normalized position within that marker period; that is, $t_R$ has a particular marker phase. Here, $m_i$ is the marker count, and is the integer number of marker periods elapsed from a chosen reference mark (e.g., the start of the corresponding NAV data sub-frame) in the signal.

Figure 6:
FIG. 6 is a timing diagram illustrating the time-delay relationship between GPS signals from two different satellites.

FIG. 6 shows a time segment of signals from satellites i and j at their respective transmitters, and the corresponding received signal segments as they later appear at a receiver. Each signal segment includes the beginning of a NAV-data sub-frame, shown as a rising edge, and several marker periods that are delineated by vertical lines. The marker phase associated with reception time $t_R$ is defined as $$\mu_i = \frac{\gamma_i}{T_i^M} \quad (9)$$

for the signal received from satellite i. Here, $\gamma_i$ is the marker-time offset observed at the receiver (offset of time $t_R$ from the beginning of the marker period in which it falls). Let $\varepsilon_i$ be the marker-time offset associated with transmit instant $t_i^T$ at the transmitter. From the constant Doppler assumption, $$\frac{\varepsilon_i}{T^M} = \frac{\gamma_i}{T_i^M} = \mu_i. \quad (10)$$

That is, the transmitted and received marker phases associated with time $t_R$ are the same.

For the signal from satellite i, the transmit time associated with receiver time $t_R$ is given by $$t_i^T = t_i^s + T^M(m_i + \mu_i), \quad (11)$$

where $t_i^s$ is the transmit time of the chosen reference mark in the signal from satellite i. From equations (1), (4), and (11), the propagation-time difference between satellites 1 and j is $$\Delta_{1j} = \tau_j - \tau_1 = t_j^T - t_1^T = t_j^s - t_1^s + T^M(m_j - m_1 + \mu_j - \mu_1). \quad (12)$$

A common transmitted marker period has been assumed in equation (12), but different satellites can use markers with different periods if these differences are taken into account. Also, $t_j^s - t_1^s$ is the difference between the transmission times of the respective reference marks from satellites j and 1. In another aspect of the invention, the reference marks are chosen to be periodic, and the same reference marks are used for all satellite signals. With this choice, each reference-mark transmission-time difference ($t_j^s - t_1^s$) equals the corresponding transmitter-signal frame-time difference ($a_j - a_1$ in FIG. 3). These differences, and repetition period $T^M$, are constant except for a very slow drift due to imperfectly synchronized GPS satellite clocks. Because these parameters change slowly, they may be stored at the railcar tracking unit as part of the AGPS data base and only occasionally updated. In another aspect of the invention, these parameters are periodically or occasionally determined at the central station and sent to the railcar as part of the AGPS data base. Propagation-time differences can then be found from equation (12) after measuring the marker counts and phases, and reading the marker period and reference-mark time differences from the AGPS data base.

Reference Mark Recognition

To measure the marker counts needed in equation (12), the chosen reference mark must be recognized in each satellite signal and then marker periods must be counted from that mark to the measurement instant $t_R$. In another aspect of the invention, the start of the GPS telemetry word preamble (TWP) is used as the reference mark in each satellite signal. The TWP is a specific eight-bit sequence (10001011) that is transmitted at the beginning of every six-second sub-frame from each satellite. This sequence cannot be duplicated by adding any prefix or post-fix of less than 7 bits to the TWP. This property allows the TWP to be used as a standard synchronization mark having a ±7 bit (±140 ms) exclusion window. The true TWP can be discerned from other identical sequences that naturally occur in the data stream (false TWPs) by looking for the set of TWP-like sequences that occur consistently on a six-second grid. Initial acquisition of the six-second TWP grid requires at least one six-second observation period and may require more if false TWPs are also present and temporarily periodic. After the true TWP grid has been acquired, a periodic observation window is synchronized with this six-second grid and new TWP events are recognized only if they fall within the observation window. By making the observation window fall within the exclusion window, subsequent false TWP detections are avoided.

After the TWP reference mark has been recognized for a first satellite signal, the corresponding TWP reference marks must be identified in the other signals. Although the TWP repeats every 6 seconds in each satellite signal, corresponding TWP reference marks are readily identified. The starting times of corresponding TWPs are all within a 1.0 ms window at transmission. The propagation delays are all within a 21 ms window because the delay from any GPS satellite to any point (line of sight) near the earth surface is bounded between approximately 58 ms and 79 ms. Therefore, corresponding TWP reference marks are those that are clustered within a 22 ms window that includes the chosen mark.

Transmission Time Determination

To calculate an approximate railcar position with equations (7), the approximate position of the involved satellites must be known. The satellites are rapidly moving and the desired positions are those at the associated transmission times $t_i^T$. The approximate satellite positions are found by using each $t_i^T$ with the approximate ephemeris data stored in the AGPS data base.

In another aspect of the invention, transmission time $t_i^T$ is first determined for a first satellite, and then equation (5) is used to derive the other transmission times. To solve equation (5), the propagation-time differences $\Delta_{1i}$ are needed, and these are calculated from equation (12). An accurate value for $t_i^T$ can be determined at the railcar by choosing the measurement time $t_R$ to coincide with the beginning of a received TWP in the signal from a first satellite (e.g., the one with the lowest GPS index), and decoding and using the immediately following GPS hand-over word (HOW) to determine the TWP transmission start time $t_1^{TWP}$. The HOW specifies the GPS time $t_1^H$ at the start of the next TWP transmission. Since the transmitted TWP is periodic with a period of $T^H = 6$ seconds, the start time of the TWP just read is the HOW value minus 6 seconds. A measurement time that is offset from the TWP start time could alternatively be used if the offset is accounted for. More specifically, the measurement time $t_R$ is chosen as $$t_R = t_1^T + \tau_1 = t_1^{TWP} + m_1 T^M + \tau_1, \quad (13)$$

i.e., to coincide with a marker that is a pre-determined integer $m_1$ marker periods after the start of the TWP in the signal received from the first satellite. The value of $m_1$ can be zero, but may be non-zero to allow a TWP detector some time to recognize the TWP occurrence and set up the measurement process. Transmission time $t_1^T$ is given by $$t_1^T = t_1^H - T^H + m_1 T^M. \quad (14)$$

Values for $m_1$, $T^M$, and $T^H$ are pre-determined and stored in the AGPS data base at the railcar tracking unit. Transmission time $t_1^T$ is said to be directly determined when the HOW is read and equation (14) is used.

The value of transmission time $t_1^T$ used at the railcar tracking unit is needed at the central station in order to correct the approximate railcar position there. In a first method, either the value of $t_1^T$ or the HOW data is communicated to the central station along with the approximate railcar position. In the latter case, equation (14) is used to reconstruct transmission time $t_1^T$ at the central station. The values for $m_1$, $T^M$, and $T^H$ that were used at the railcar tracking unit are made available at the central station by using the same AGPS data there. In a second method, the HOW value that was received at the railcar tracking unit is also received and read at the central station using a GPS receiver there. This saves railcar energy since less data must be transmitted to the central station. However, a new HOW occurs every six seconds in each GPS signal, and the correct HOW (the one used at the railcar tracking unit) must be identified in the GPS signal received at the central station. The correct HOW can be identified at the central station if data specifying the index of its associated sub-frame (with respect to the beginning of the week) is sent to the central station. Alternatively, the HOW can be identified by its reception time at the central station if railcar tracking unit measurements are made on a time or sub-frame schedule known to both the railcar tracking unit and the central station. A method for accomplishing this is described later.

In summary, an approximate railcar position can be determined at the railcar tracking unit by 1) energizing the receiver and waiting for some short stabilization period,
2) processing the received signal to acquire code and data-bit timing for four satellite signals,
3) recognizing the TWP starting edge in each satellite signal,
4) choosing the signal with the lowest GPS index as the reference signal (signal 1) and using bit or codeword edges as markers in each signal,
5) reading $m_1$ from the AGPS data base and assigning the measurement instant $t_R$ to be $m_1$ marker periods after the starting edge of the TWP in the reference signal,
6) measuring marker counts and phases for the measurement instant, the counts being measured with respect to the starting edge of the TWP in each satellite signal,
7) reading the pre-determined transmitter marker period and frame-time differences from the AGPS data base and then using equation (12) to calculate the propagation time differences,
8) reading the HOW time value from the reference signal and using equation (14) to calculate the reference signal transmission time,
9) using equation (5) to calculate the remaining transmission times,
10) using the transmission times with the approximate ephemerides from the AGPS data base to determine satellite locations, and
11) using equation (7) to find the railcar position. If desired, a different measurement instant could be used for each satellite signal, but the time delay between measurements, and any receiver motion during these delays, must be taken into account.

HOW Table

In yet another aspect of the invention, frame-time differences are derived from a table of HOW time values that are stored as part of the railcar AGPS data base. The table has one HOW value for each GPS satellite. Each HOW value is one that was actually transmitted by the associated satellite and specifies the six-second TWP time grid for the given satellite. A new table of HOW values is periodically or occasionally determined at the central station and sent to the railcar tracking units. This is called a complete HOW update. When a frame-time difference between two satellites is needed, it is derived by reading the associated HOW time values from the table and forming their difference. This difference is calculated modulo the interval (−3, 3) because the frame-time offsets are known to be within this range. More specifically, if $t_i^H$ and $t_j^H$ are the stored HOW time values for satellites i and j, then the frame-time difference is $\xi_{ji}$ and is calculated from $$\xi_{ji} = t_i^H - t_j^H - KT^H, \quad (15)$$

where $$K = \left[ \frac{t_i^H - t_j^H}{T^H} \right] \quad (16)$$

The brackets mean to round to the nearest integer. The result of equation (15) is the desired frame-time difference.

Frame-Time Updating

The railcar position calculated from equations (7) is very sensitive to errors in the frame-time differences used in equation (12), and it is possible that frame-time differences change too much between the scheduled (e.g., two-week) AGPS updates to allow accurate results. In another aspect of the invention, therefore, changes in the actual frame-time differences are tracked at the railcar tracking unit by occasionally updating the HOW table with new HOW time values derived from GPS measurements made at the railcar. A HOW update is performed for a given satellite signal by recognizing a TWP in that signal, reading the following HOW time value, and storing it in the table. In one updating method, a HOW update is performed for each satellite signal during a single fix, and the new HOW values are used in equations (15) and (16) to calculate the frame-time differences for the fix. This is called a multiple HOW update for the given fix. With a multiple HOW update, the frame-time differences will be very accurate. In an alternative updating method, a HOW update is performed for only the reference signal. This is called a single HOW update for the fix and can require less processor complexity.

HOW Update Communication

The central station needs to utilize the frame-time difference values used at the railcar tracking units in order to calculate accurate railcar positions from the approximate positions received from the tracking units. These differences can be obtained at the central station by reading and using the same HOW time values as were used at the railcar tracking units. If the railcar tracking units update their HOW tables only with AGPS data sent from the central station, the station can track what it sent and determine what HOW time values each railcar tracking unit is using. If the tracking units are also performing single or multiple HOW updates (i.e., updating their HOW tables with direct signal measurements), then the updates must be communicated to the central station. Furthermore, the central station must maintain a HOW table for each railcar tracking unit.

Either of two methods may be employed for communicating single or multiple HOW updates to the central station. In the first method, the updated HOW value for the reference satellite is sent to the central station and used to update the associated HOW table there. With a multiple HOW update, the updated HOW values for the other (non-reference) satellites are read directly from the GPS signals at the central station by using a GPS receiver there. For each non-reference signal, the correct HOW event is identified as the HOW that is closest in time to that of the HOW from the reference satellite. To make the central station aware of the type of HOW update performed (i.e., single update, multiple update, or no update), a HOW-update status flag is included with the other data for the fix. Alternatively, the HOW sub-frame index is determined at the railcar tracking unit and sent to the central station instead of sending any HOW values. The correct HOW events are then identified at the central station by the index of the associated sub-frame.

In a second method for communicating HOW updates to the central station, the HOW-update status flag is sent to the central station but no HOW values or sub-frame indices are sent. Instead, all updated HOW values are read directly from the GPS signals at the central station by using a GPS receiver there. Railcar measurements are made on a pre-arranged time schedule known at the central station, and the correct HOW events are identified at the central station by their time values. This method has the advantage that less data is communicated to the central station, but it is sensitive to time schedule errors.

Reduced Receiver Time

Railcar tracking unit energy use can be further reduced by reducing the receiver ON time associated with each fix. It would be advantageous if re-acquisition of the six-second TWP grid were avoided for most fixes, and if the HOW processing were only occasionally needed. In another aspect of the invention, railcar tracking unit energy use is reduced by using an accurate local railcar tracking unit time clock to "awaken" (i.e., fully energize) the railcar receiver just prior to the expected arrival of the TWP from a selected set of satellite signals. The receiver remains awake just long enough to recognize a pre-determined reference mark within the TWP from one selected reference satellite signal, and to make marker phase measurements for the other selected satellite signals. The marker count $m_1$ for the reference satellite signal is set to a pre-determined integer (zero, if $t_R$ is chosen to coincide with the reference mark). The marker counts for the other signals are deduced, as described below, from the approximate satellite positions, frame-time differences, prior approximate railcar position, and the limited distance traveled since the prior fix. Thus there is no need to actually observe the TWP in the other satellite signals. Also, as described below, the transmit time $t_1^T$ (needed for determining satellite positions) is found without reading the associated HOW time value.

Single Reference-mark Observation

If the marker period is large enough, and if the railcar position is approximately known or cannot have moved substantially from its position at the prior fix, then the correct marker count for the non-reference satellites can be found without actually observing the associated reference mark. In concept, equations (12) and (7) can be repeatedly used to calculate railcar position while trying different marker counts for each satellite until a feasible railcar position is the result. If bit edges are used as markers, the propagation-delay differences from equation (12) will have large error if the wrong marker counts are used. This will yield a very large (easily recognized) railcar-position error. In practice, the marker count for each satellite i, for i=2, 3, 4, can be determined as follows: First, suppose that time $t_1^T$ has already been determined. From equation (4) and the definition of $t_R$, it is true that $$t_R = t_1^T + \tau_1 = t_i^T + \tau_1. \tag{17}$$

Combining equation (11) with (17) and solving for $m_i$ yields $$m_i = Mm_1 + (\mu_1 - \mu_i) + \left[\frac{\xi_1}{T^M} + \frac{\tau_1 - \tau_i}{T^M}\right], \tag{18}$$

for each satellite, i. Here $\xi_{i1} = t_1^s - t_i^s$ is the previously described transmission frame-time difference. The marker phases ($\mu_1$ and $\mu_i$) are known because they are measured, and $m_1$, $T^M$, and the frame-time differences are all obtained from the AGPS data base. The propagation delays ($\tau_j$) are not known exactly, but can be estimated from $$\tau_j = \frac{R_j}{c}, \text{ for } j = 1, 2, 3, 4, \tag{19}$$

where $R_j$ is calculated from equation (3) by using an estimated railcar position with a satellite position derived from the approximate ephemeris equations.

Equation (18) must yield an integer marker count. Therefore, small errors in the propagation delays are tolerable because the right-hand side of equation (18) will be rounded to the nearest integer. Because small propagation errors are tolerable, the satellite and railcar positions need not be very accurate when calculating the range used in equation (19). Therefore, approximate values for the transmission times ($t_i^T$) can be used to determine satellite positions needed in equation (19). One approximation is to use the known value of $t_1^T$ as the supposed transmission time for all satellites. From equation (4), the transmission times for satellites 2 through 4 will be in error by, at most, 21 ms because the propagation delays can vary by only this much. Because the satellites move at approximately 3.5 km per second, the satellite positions will be in error by, at most, approximately 70 meters. The error in propagation delay caused by this satellite position displacement is very small compared to the marker period so that the rounded result of equation (18) is unaffected.

The approximate railcar position, used to calculate range in equation (19), can be taken as the position calculated at the last fix. If the railcar has not moved more than one-half of the ambiguity distance associated with the marker period, then the rounded result of equation (18) will be unaffected by the railcar position error. For a given marker period, the smallest possible ambiguity distance d occurs when the satellite is on the horizon and is approximately given by $$d = T^M c. \tag{20}$$

When the marker period is 20 ms, the smallest ambiguity distance is approximately 6000 km. If railcar speed is limited to approximately 100 km/hr, then up to 30 hours can pass (since the last fix) without losing track of the marker count.

Determine Transmit Time Without Observing HOW

With the above method, the value of $t_1^T$ can be accurately determined by reading the associated HOW value and using equation (14). In an alternative method called the prediction method, $t_1^T$ is predicted using the number of six-second sub-frames elapsed from the known starting time of an earlier initial TWP transmitted from the same satellite. The initial TWP starting time for each satellite can be stored as part of the AGPS data base. Furthermore, whenever a HOW value is derived from the NAV data stream at the railcar, it can be used to update the associated satellites' initial TWP starting time (e.g., by using equation (14) with $m_1$=0).

If $t_1^{REF}$ is the known starting time of the initial TWP, then the predicted value of time $t_1^T$ is given by $$t_1^T = t_1^{REF} + K_1 T^H + m_1 T^M, \tag{21}$$

where $K_1$ is the integer number of sub-frames elapsed from time $t_1^{REF}$ to time $t_1^T$. If $K_1$ is known a-priori (e.g., if measurements are made on a pre-determined sub-frame schedule, as described later), then time $t_1^T$ is found from equation (21) directly. If $K_1$ is not known, it can be calculated from measurement time (indicated by the railcar tracking unit clock) as follows. First, from equation (17), an approximate transmission time can be calculated from $$\tilde{t}_1^T = \tilde{t}_R - \tau_1, \tag{22}$$

where $\tilde{t}_R$ is the railcar tracking unit clock reading at the measurement time, and $\tilde{\tau}_1$ is an approximate propagation delay. By using the approximate transmission time from equation (22) in equation (21) and rearranging, the integer number of elapsed sub-frames is calculated as $$K_1 = \left\lceil \frac{\tilde{t}_R - \tilde{\tau}_1 - t_1^{REF} - m_1 T^M}{T^H} \right\rceil \tag{23}$$

The brackets in equation (23) indicate rounding to the nearest integer, as is needed to account for small errors in $\tilde{t}_R$ and $\tilde{\tau}_1$. Finally, the predicted value of $t_1^T$ is found from equation (21), using the calculated value of $K_1$. Any feasible value (even zero) can be used for the approximate propagation delay because the propagation delay is very small compared to the six-second HOW repetition period.

Windowed Marker Recognition

In another aspect of the invention, reference-mark reception time is used to discern a specific desired reference mark from nearby false reference marks in the reference signal. The long reception time associated with acquiring TWP synchronization and reading a HOW value is avoided. Receiver energy use is reduced by leaving the receiver off until just before the reference mark is expected. The correct reference mark is distinguished from nearby false reference marks by predicting the reception time of the correct reference mark (as measured by the local railcar tracking unit clock) and taking the received reference mark nearest to the predicted time as the desired reference mark. The receiver clock is kept sufficiently accurate that the correct reference mark is always identified.

Figure 7:
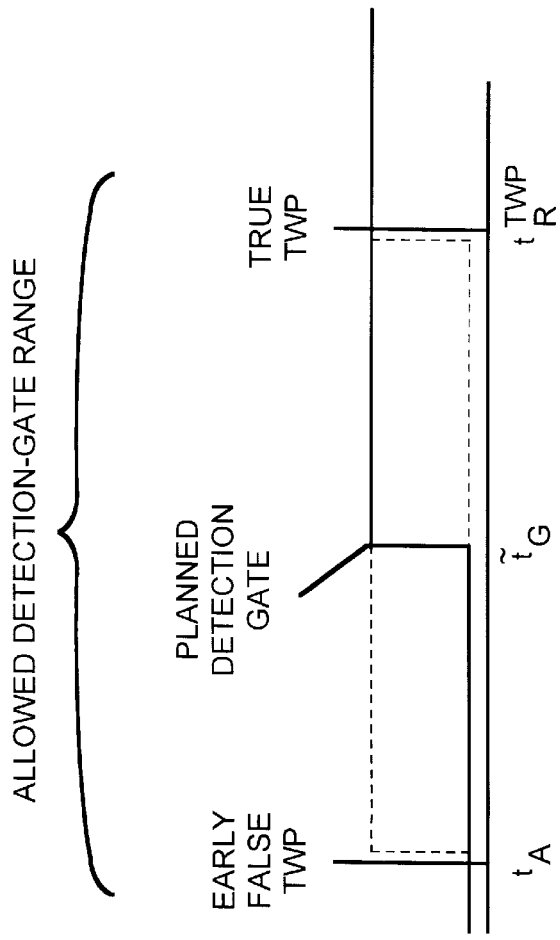
FIG. 7 is a timing diagram illustrating a reference-mark detection process that allows for some railcar clock error.

The clock accuracy needed for correct reference mark (i.e., TWP) detection can be understood by referring to FIG. 7. FIG. 7 shows the output of a receiver's TWP detector over a time segment that includes a true TWP and an early false TWP sub-sequence. The early false detection shown is worst case, in that it is as late as is possible for the given the exclusion window while still being before the true TWP. The starting edge of the true TWP is received at time $t_R^{TWP}$ while the early false detection is received at time $t_A$. To recognize the true TWP with only a short observation, the receiver and detector are disabled until detection-gate time $t_G$ and enabled thereafter. The first detection is treated as the true TWP. The gate time is chosen to satisfy $$t_A < t_G < t_R^{TWP} \tag{24}$$

so that the true TWP is detected while the early false TWP is not detected. By placing the planned time for $t_G$ at half-way between $t_A$ and $T_R^{TWP}$, the largest unbiased clock error is allowed. Define $\tilde{t}_c$ as the time indicated by the railcar tracking unit clock and $t_c$ as the associated true time. At any given instant, the clock has error $\xi_c$ so that the true and indicated times are related by $$t_c = \tilde{t}_c + \xi_c. \tag{25}$$

Define $t_E = t_R^{TWP} - t_A$ as the early exclusion window width and let $\tilde{t}_G$ be the indicated gate time associated with true gate time $t_G$. Next, set the desired indicated gate time so that $$\tilde{t}_G = T_R^{TWP} - \frac{t_E}{2}, \tag{26}$$

that is, at the time half-way between $t_A$ and $t_R^{TWP}$. Then the gate is actually enabled at time $$t_G = \tilde{t}_G + \xi_C = t_R^{TWP} - \frac{T_E}{2} + \xi_C \tag{27}$$

and, according to equation (25), TWP detection error is avoided only if $\xi_c$ satisfies $$|\xi_C| < \frac{t_e}{2} \tag{28}$$

If a false TWP is detected, the calculated value of $t_1^T$ will be incorrect for the actual mark used in the measurement. An incorrect value of $t_1^T$ will cause error in the satellite positions used in equation (7), and this will cause additional railcar position error that cannot be corrected at the central station.

Simplified Reference Mark

In another aspect of the invention, the end of the 1011 sub-sequence in the TWP (10001011) is defined as the reference mark. The 1011 pattern is called the reference pattern and the reference mark is found by searching for the reference pattern in the data stream. The above reference pattern can also be found by a bit-change pattern filter that looks for a change in bit value (1 to 0), followed by another change (0 to 1), followed by no change (0 stays 0). Due to the structure of the TWP, this change pattern occurs at no other place within the TWP. This means that the true reference mark will be the only reliably periodic reference-mark detection in the NAV-data sequence. Also, no false reference mark can occur less than 5 bit periods prior to the true reference mark. A receiver that uses a bit-change pattern filter may be easier to implement than one using a bit-value pattern filter because bit-changes can be determined by comparing signal carrier phases from adjacent bit periods. Other TWP sub-sequence bit-change patterns can also be used, as will be recognized by those skilled in the art.

Railcar Tracking Unit Clock Synchronization

In another aspect of the invention, the railcar tracking unit clock is kept accurate by synchronizing it to the measurement time $t_R$ calculated during each railcar fix. Initially, when no AGPS data has yet been received, an accurate $t_R$ value is determined by acquiring the TWP grid for all four satellites and then performing a fix using a multiple HOW update. The multiple HOW values provide the satellite transmission times needed to determine the satellite positions and the frame-time differences. After the approximate railcar position has been determined, propagation delay $\tau_1$ is calculated from equation (19) and reception time $t_R$ is calculated from equation (17). The clock is then set to the calculated value of $t_R$ plus any time elapsed since the measurement was made. Clock accuracy is then maintained by re-synchronizing the clock with the calculated $t_R$ after each fix.

Immediately after re-synchronizing the clock, the residual clock error will be approximately equal to the error in time $t_1^T$ plus the error in propagation delay $\tau_1$. If time $t_1^T$ was determined by reading the HOW and using equation (14), then it is nearly exact and the initial clock error is just the error in the calculated value of $\tau_1$. The worst case $\tau_1$ error is approximately 16.7 microseconds because the approximate satellite positions are accurate to within 5000 meters. If time $t_1^T$ was calculated by the prediction method, it may have error due to deviation of the satellites' sub-frame period from $T^H=6$ seconds. However, because the MCS keeps the magnitude of frame-time offsets below 1.0 ms, this calculated value of $t_1^T$ will never be in error by more than 1.0 ms. Because frame-time offsets change slowly, the error in $t_1^T$ will be much smaller than 1.0 ms if the initial TWP time $t_1^{REF}$ is updated frequently enough (e.g., once per day). With either method for determining time $t_1^T$, clock error will be less than 1.0 ms immediately after re-synchronization.

Between re-synchronization epochs, the railcar tracking unit clock error $\xi_c$ increases with time due to an unknown offset in the frequency standard. An inexpensive clock can keep time with an error-accrual rate $\delta$ bounded by $|\delta|<1\times 10^{-6}$ seconds/second, while atomic frequency standards can have $|\delta|<1\times 10^{-13}$. For a given error-accrual rate, the clock error is given by $$\xi_c=\xi_1+\delta\Delta_t. \quad (29)$$

where $\Delta_t$ is the time since the last re-synchronization, and $\xi_1$ is the initial error immediately after re-synchronization. To maintain clock accuracy and avoid additional railcar position error, the correct reference mark must be detected at each re-synchronization epoch. This requires that equation (28) be satisfied. By combining equations (28) and (29), an upper bound on the time between re-synchronization events is found as $$\Delta_t < \frac{t_E - 2|\xi_1|}{2|\delta|} \quad (30)$$

If the early exclusion window width $t_E$ is 100 ms (5 bit periods), while $|\xi_1|$ is 1.0 ms and $|\delta|=1\times 10^{-6}$, then accurate clock re-synchronization occurs if $\Delta_t$ is no larger than $4.9\times 10^4$ seconds (13.6 hours).

If a false TWP is used to re-synchronize the clock, the clock will develop an additional fixed error. Subsequent false TWP detections will add additional errors. The probability of false TWP detection can be made very low by choosing a clock with sufficiently small "worst-case" $|\delta|$. However, a false detection could still eventually occur. Excessive clock error is usually detectable using only a short signal observation. For example, when a TWP is not detected within $t_E$ seconds of the detection gate onset, the clock error is probably larger than that allowed by equation (28). To recover from discovered or undiscovered clock errors, it is advantageous to occasionally or periodically perform a TWP grid re-acquisition and re-synchronize the clock using a $t_1^T$ determined by reading a HOW value.

Measurement Grid

In another aspect of the invention, each scheduled railcar measurement is associated with a specific sub-frame index and is made to coincide with the reception of a marker that is a pre-determined number of marker periods after the TWP in that sub-frame. A sequence of pre-arranged transmission times can be described by a sub-frame schedule. For example, a railcar tracking unit can be scheduled to make measurements approximately every 15 minutes by making a measurement every 150 sub-frames. Schedule parameters (e.g., starting sub-frame and number of sub-frames between measurements) may be changed by the central station and broadcast to the railcar tracking units, or each tracking unit may change the schedule according to local conditions and communicate the change to the central station. With this measurement scheduling method, the reference-signal transmission time associated with each scheduled measurement can be determined at the central station with little or no time information from the railcar tracking unit.

For each scheduled measurement, the desired TWP is identified using the detection gate described earlier. The detection-gate time $\tilde{t}_G$ is determined by 1) specifying the sub-frame index $I_f$ for the current planned measurement,
2) predicting the associated TWP transmission time $\tilde{t}_i^{TWP}$ for each expected receivable satellite signal,
3) estimating the associated TWP railcar reception times, $\tilde{t}_i^R$,
4) processing the received signal for a time $\tau_P$ that is sufficient for reliably detecting, identifying, and acquiring marker timing for four satellite signals, where processing is started early enough that detection, identification, and marker-timing acquisition are completed before the TWPs are received, and
5) choosing the satellite signal with the lowest GPS satellite index as the reference satellite signal and setting TWP detection-gate time $\tilde{t}_G$ so that the correct TWP is detected.

For a given sub-frame index $I_f$ and satellite i, the predicted TWP transmission time $\tilde{t}_i^{TWP}$ is found by reading the HOW table time $t_i^H$, determining its associated sub-frame index $I_i^H$, and then calculating $$\tilde{t}_i^{TWP}=t_i^H+(I_f-I_i^H)T^H. \quad (31)$$

Here $I_i^H$ could have been stored in the HOW table along with the associated HOW value, or calculated from $$I_i^H = \left[\frac{t_i^H}{T^H}\right] \quad (32)$$

where the brackets indicate rounding to the nearest integer. It is not known a-priori which satellites will be detectable at the desired measurement time, so the TWP transmission time is predicted for the satellite that has the most recent HOW table entry. The choice is not important because the TWP transmission times for a given sub-frame from different satellites differ by, at most, $\tilde{\xi}=1$ ms. The earliest TWP reception time for sub-frame $I^f$ from any satellite is then approximated as $$\tilde{t}_R^{TWP} = \tilde{t}_i^{TWP} - \tilde{\xi} + \tilde{t}, \quad (33)$$

where $\tilde{t}=58$ ms is the smallest possible propagation delay from the GPS satellites to the railcar. Processing of the received signal is then started at time $$t_P = \tilde{t}_R^{TWP} - \tau_P - \frac{t_E}{2}. \quad (34)$$

This insures detection of four satellite signals prior to TWP reception while accounting for the worst-case clock error. The detected signal with the lowest GPS index is declared the reference signal, and a search for the TWP in this signal is begun by enabling the detection gate at indicated railcar time $$\tilde{t}_G = \tilde{t}_R^{TWP} - \frac{t_E}{2}. \quad (35)$$

The clock is kept accurate enough such that the desired TWP is the one that is detected. Slightly more clock error can be tolerated if the frame-time offset and signal-propagation delay are estimated specifically for the reference satellite signal and used in equations (33) and (35) to determine a more accurate detection-gate time.

Reporting Modes and Schedule

Each railcar tracking unit reports its position and related data to the central station, and the frequency and format of these reports can be made to depend on the perceived movement of the railcar and on specific sensed events at the railcar. In another aspect of the invention, a sequence of two or more approximate railcar positions are used by the railcar tracking unit to determine whether or not a substantial railcar movement has occurred. When the railcar position is not substantially changing, the railcar tracking unit is set to stationary mode and the fix and reporting frequencies are made low. This conserves railcar tracking unit energy. When the railcar position is substantially changing, the railcar tracking unit is set to moving mode and the fix and reporting frequencies are made high. To further reduce railcar tracking unit energy use associated with communication channel acquisition, data from several adjacent fixes can be included in one report to the central station.

In one embodiment, when a railcar tracking unit is in the stationary mode, a fix is made approximately every eight hours and a single report is made approximately every 24 hours. As described earlier, fixes are actually scheduled according to sub-frame indices. The report includes data for the most recent fix, and absolute position is used. The other fixes serve to keep the railcar tracking unit clock synchronized to GPS time and to allow detection of substantial railcar movement with only an eight-hour latency. When the position from one fix is substantially changed from that of the prior fix, the railcar tracking unit is set to the moving mode. In the moving mode, a new position is calculated every 15 minutes and four consecutive positions are collected and sent in a single report made every hour. To reduce communication-channel occupancy and railcar tracking unit energy use, relative positions are used in moving-mode reports. During an extended period of moving-mode operation, error can accrue in the calculated absolute position at the central station due to communication errors. This accrued position error is reset to zero whenever an absolute position is correctly received by the central station. To protect against a long string of erroneous positions, a moving-mode report is periodically modified to include an absolute position. When several moving-mode fixes yield substantially the same railcar position, the railcar tracking unit is set to the stationary reporting mode.

It is convenient to use a single fixed periodic sub-frame set for moving-mode measurements, and a separate fixed periodic sub-frame set for stationary-mode measurements. Then the measurement-schedule parameters can be fixed and the railcar tracking unit can select the schedule appropriate to the reporting mode. Each report includes a report-type indicator that the central station uses to determine which schedule is in effect.

When the railcar is in the moving or stationary modes, it is convenient to determine the sub-frame index $I_f$ and the processing start time $t_P$ for the next scheduled measurement immediately after calculating the fix for the current measurement. Then the receiver and processor can be put to sleep (disabled to conserve energy), and a timer set to awaken (re-energize) them at time $t_P$. When a scheduled measurement has just been made, the index of the next measurement sub-frame is readily found from the sub-frame schedule. However, when no measurement has yet been made or when sub-frame synchronization has been lost, the index of the next scheduled measurement sub-frame is determined by calculating the transmitted sub-frame index associated with the current railcar tracking unit clock reading and examining the measurement schedule to find the next later sub-frame index.

In another aspect of the invention, important events are sensed at the railcar tracking unit, and data associated with the events are sent to the central station in an exception-mode report. Events that are sensed include a substantial mechanical shock, temperature out-of-bounds, railcar tracking unit HOW-table updates, and HOW-based clock re-synchronization. Each exception-mode report includes a single absolute fix, the event time, and data describing the event. For example, when significant clock error is suspected at the railcar tracking unit, a clock re-synchronization fix is performed at the tracking unit by reading and using a HOW value, as described earlier. The re-synchronizing HOW value (or its associated sub-frame index) is included in the report. When re-synchronizing the clock at the railcar tracking unit, the amount of correction can be measured and included in the report for use at the central station.

Railcar tracking unit reports may also include other information needed at the central station. For example, each railcar fix is associated with a set of satellites whose signals were used in the fix. These satellites must be identified at the central station in order to correct the approximate railcar position. Each report includes data that specifies the set of satellites for each fix in the report. Data describing the report type (moving, stationary, exception) and format are also included in each report. This allows the central station to properly decode the report data and take appropriate action for each report. Data identifying the particular railcar may also be included in the report. While specific report types, modes, contents, schedules, and mode-transition schemes have been described, various modifications will be apparent to one skilled in the art.

Absolute and Relative Fixes

For the railcar tracking application in North America, railcars are constrained to the earth surface in a region extending from approximately 25° N to 55° N latitude, and from 60° W to 135° W longitude. In this region, the elevation varies from near sea level to approximately 5000 meters above sea level. For an absolute fix, position data are encoded in the latitude-longitude-elevation (LLE) coordinate system and the number of bits needed for each coordinate depends on the dynamic range of the coordinate and the desired resolution. GPS measurements yield average rectilinear position accuracy and resolution that are relatively constant over the earth surface. However, the effective rectilinear resolution of an LLE encoded position varies with position and is poorest (largest distance between adjacent representation points) for the lower-latitudes. A sufficient rectilinear resolution is maintained throughout the region by specifying the longitudinal step size so as to yield the minimum acceptable rectilinear resolution along the lower-latitude side of the North American region. The length of this longest side is $L_A = r_E \Delta_{Lon}$ meters, where $r_E = 6.4 \times 10^6$ is the earth radius in meters and $\Delta_{Lon} = 1.31$ is the longitudinal width of the North American region in radians. Let the minimum desired rectilinear resolution for x, y, and z be $\zeta$ meters. Then the number of distinct longitudes is $L_A/\zeta$, and the number of bits for the longitude component is $$B_{Lon} = \log_2 \frac{L_A}{\zeta}. \tag{36}$$

Similarly, the number of bits for the latitude component is given by $$B_{Lat} = \log_2 \frac{r_E \Delta_{Lat}}{\zeta}, \tag{37}$$

where $\Delta_{Lat} = 0.52$ is the latitudinal width of the North American region in radians. The number of bits for the elevation component is given by $$B_z = \log_2 \frac{\Delta_z}{\zeta}, \tag{38}$$

where $\Delta_z = 5000$ is the elevation range in meters. It is assumed that the desired rectilinear resolution at the central station is $\zeta = 30$ meters. Using these values in equations (36) through (38) yields $B_{Lon} = 18$ bits, $B_{Lat} = 17$ bits, and $B_z = 8$ bits for a total of 43 bits for position in an absolute fix.

For relative fixes, assume a maximum railcar speed of S m/s, and a uniform time $t_F$ between fixes. Then in the time between fixes, a railcar can move, at most, $St_F$ meters in any direction from the last position. Thus the railcar must lie within a horizontal square that is centered at the last position and has sides of length $L_R = 2St_F$. Suppose that S=55.5 m/s and $t_F = 900$ seconds so that $L_R = 9.99 \times 10^4$ meters. Substituting $L_R$ for $L_A$ in equation (36) yields $B_{Lon} = B_{Lat} = 12$ bits. It is assumed that a railcar elevation cannot change by more than 1 meter per second because trains travel slowly on steep grades. In 900 seconds, the elevation can change by, at most, 900 meters up or down. Thus, the dynamic range is 1800 meters and equation (35) yields $B_z = 6$ bits. Therefore, the position in a relative fix uses 30 bits.

While the LLE coordinate system was described above, other coordinate systems could also be used at the railcar. For example, other polar coordinates could be used such that the zero-latitude line bisects North America. This would minimize the variation in rectilinear resolution across the region after encoding.

Another alternative for reducing energy consumption at the railcar by reducing the number of bits transmitted from the railcar is to store, in a database at the central station or at a location in communication with the central station, an altitude map of the country or geographical area traversed by the railcar. This eliminates the need for the railcar to transmit altitude data since the altitude can now be deduced at the central station from the railcar latitude and longitude data. In so doing, a reduction of about 20% in the absolute and relative data transmitted can be achieved.

Difference Encoding

When approximate positions are calculated at the railcar using equation (7), the result is an absolute position in rectangular coordinates relative to some specified origin. Before transmission to the central station, the calculated absolute position is first transformed to LLE coordinates. Alternatively, equation (7) can be modified to yield LLE coordinates directly. If necessary, each coordinate of the absolute LLE position is then rounded (quantized) to the nearest representation value commensurate with the desired resolution at the central station. When relative positions are to be sent to the central station, each relative LLE coordinate is calculated by subtracting the prior rounded absolute coordinate value from the current rounded absolute coordinate value. The dynamic range of the relative coordinates is substantially reduced because of the limited railcar speed. The relative coordinates can then be represented with fewer bits without reducing the coordinate resolution. At the central station, relative coordinate values are converted to absolute coordinate values by summing all relative values received for that coordinate since the most-recent absolute coordinate value was sent, and adding the result to the most-recent absolute coordinate value.

Figure 8:
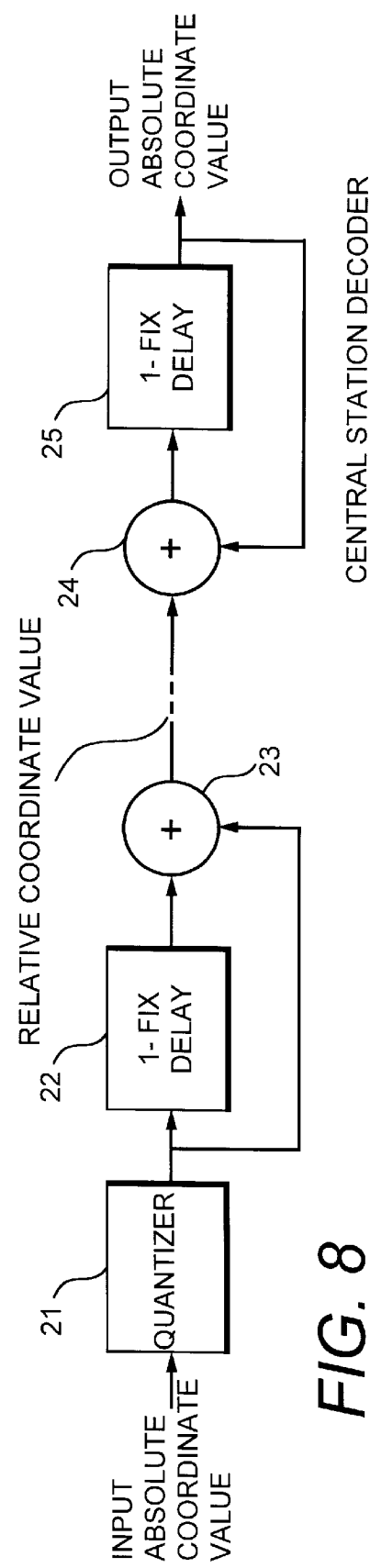
FIG. 8 is a block diagram of a differential encoder and decoder used in communicating railcar position data.

The longitude encoding and decoding process is illustrated in FIG. 8 for the case where the original absolute longitude values have a higher resolution than is needed at the central station. The absolute coordinate value computed at the railcar tracking unit is supplied to a quantizer 21, the output signal of which is provided to a one-fix delay 22 and a summer 23. In summer 23, the previous quantized value supplied from delay 22 is subtracted from the current quantized value to generate the relative coordinate value that is transmitted to the central station. At the central station, the relative coordinate value is supplied to summer 24 which accumulates the relative coordinate values by summing with the output signal of a one-fix delay 25. In this way, the absolute coordinate value is regenerated at the central station. When long sequences of relative fixes are made at the railcar tracking unit, however, it is important to perform any needed quantization of the absolute coordinate values before the relative coordinate values are calculated. This insures that post-subtraction quantization noise from the encoder does not accrue in the decoder summation at the central station.

Railcar Process

Figure 9:
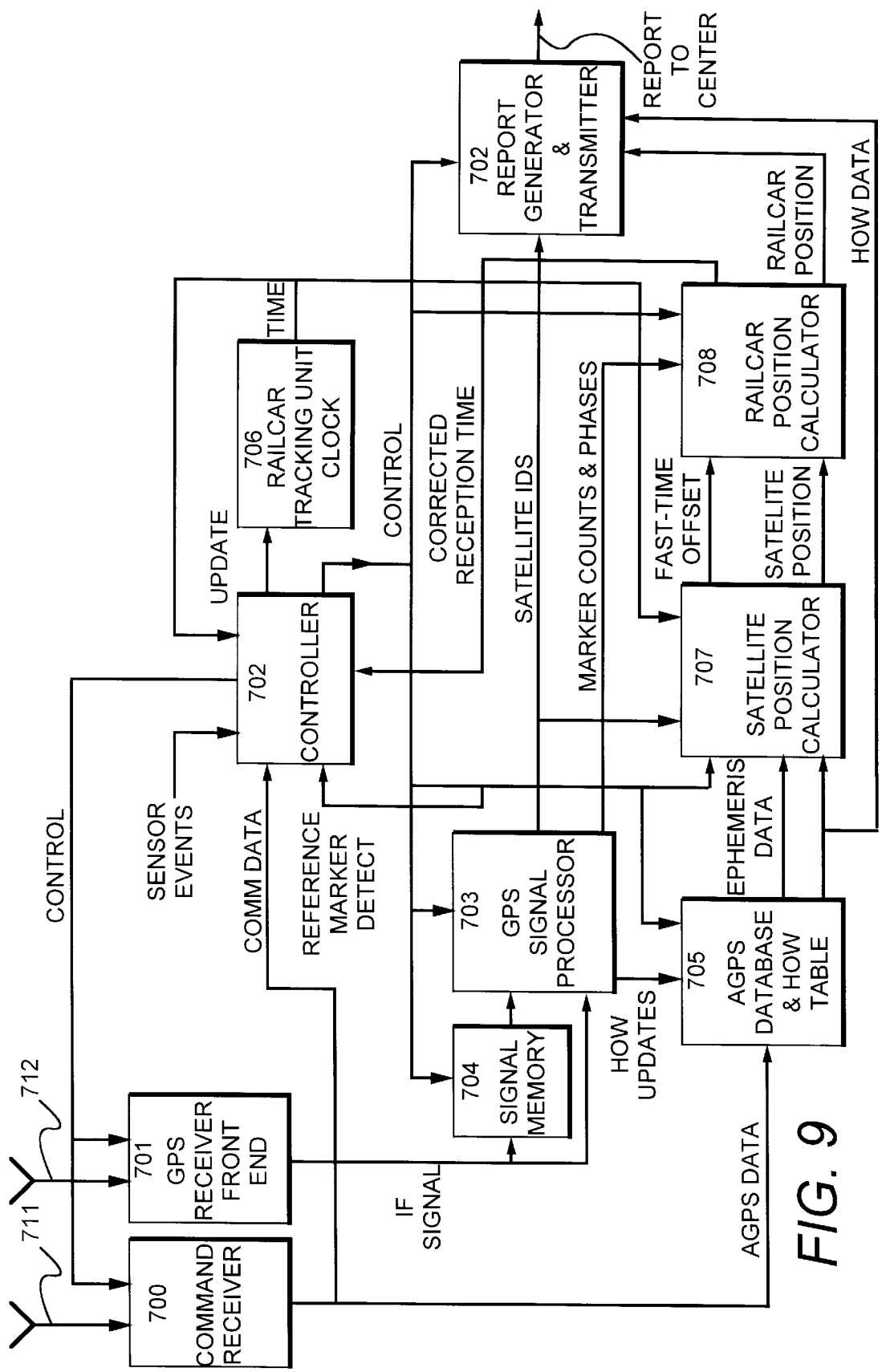
FIG. 9 is a block diagram of the processing circuitry employed in a railcar tracking unit.

A block diagram of a preferred railcar tracking unit processing circuitry is shown in FIG. 9. Under control of a controller 702, a command receiver 700 is energized and railcar commands and AGPS data are receivedthrough an antenna 711 from the central station. Controller 702 then switches command receiver 700 to a low power or no-power condition to conserve energy. The AGPS data is stored in an AGPS data base 705. AGPS data include ephemeris data for all GPS satellites and HOW times for the HOW table, and further include time parameters for 1) the stationary and moving-mode measurement (fix) and report-transmission schedules, 2) performing multiple HOW updates, 3) predicting TWP transmission times, and 4) receiving new commands and AGPS updates from the central station.

Also under control of controller 702, GPS receiver front end 701 is energized and a moving-mode, stationary-mode, or exception fix is made. Front end 701 receives GPS signals through a GPS antenna 712 and generates a sampled and quantized intermediate frequency (IF) output signal. A segment of the IF output signal is stored in a signal memory 704 and the GPS receiver front end is turned off. Selection of the stored segment is determined by controller 702 so as to include the expected reference mark (TWP) from candidate satellite signals. By ascertaining the sample rate and the reception time of the first sample, controller 702 associates a reception time with each memory location. A GPS signal processor 703 then reads the stored signal and determines code phase, frequency shift, and GPS satellite index for four GPS signals by cross correlating segments of the stored signal with selected GPS replica signals. The GPS signal with the lowest satellite index is determined to be the reference signal and NAV-data bit timing is determined for this signal. The gate time for the expected reference-signal TWP is calculated, and an attempt is made to detect the TWP. If the TWP is not detected within the expected signal time window, a clock error is assumed and the present fix is terminated.

If a TWP is detected within the expected time window, the measurement time is chosen as coincident with the TWP, and marker counts and phases for the non-reference signals are measured. Bit-period edges are used as markers and the marker period is assumed to be 20 ms. The marker counts and phases are sent to a railcar position calculator 708 while the GPS satellite indices are sent to a satellite position calculator 707 and report generator 709. Using stored TWP time parameters from the AGPS data base, the satellite position calculator calculates frame-time offsets and transmission times associated with the marker-phase measurement. Furthermore, ephemeris data from the AGPS database are used with the GPS satellite indices and the calculated transmission times to calculate the satellite positions. Railcar-position calculator 708 then calculates the approximate railcar position from the frame-time offsets, marker counts and phases, and satellite positions. By using the satellite positions and transmission times with the calculated railcar position, the railcar position calculator also calculates the corrected measurement time. The corrected measurement time is sent to controller 702 where elapsed time (since the signal segment was stored) is monitored using a railcar transmission unit clock 706. The controller calculates the corrected present railcar time and updates the railcar transmission unit clock. The railcar position, satellite indices, HOW or sub-frame identification data (if needed), and flags identifying the type of fix and reporting mode are sent to report generator 709. Report generator 709 combines current fix data with past fix data, if appropriate for the reporting mode, and encodes the report data for transmission to the central station.

When a clock error has been determined, or as otherwise commanded by controller 702, a TWP grid-acquisition fix is made and reported to the central station in an exception report. Controller 702 turns on GPS receiver front end 701 and a segment of IF output signal is stored in memory 704. GPS signal processor 703 reads the stored signal and determines code phase, frequency offset, and GPS satellite index for four GPS signals. Correct real-time replica GPS signals are then generated for each satellite signal by using the determined code phases and frequency offsets and accounting for the elapsed time since the signal segment was stored. The correct replica signals are then cross correlated with the real-time IF output signal to demodulate the NAV data streams of the corresponding GPS signals, perform TWP grid acquisitions, and read four corresponding HOW values. The AGPS HOW table is updated with these HOW values. After acquiring the TWP grids, the GPS signal with the lowest satellite index is determined to be the reference signal and marker counts and phases are measured at a measurement time coincident with the reference signal TWP. Controller 702 then turns off the GPS receiver front end. The approximate railcar position is then calculated as described above for a fix without TWP grid acquisition. However, the GPS sub-frame index (associated with the fix) is included in the report sent to the central station.

Controller 702 also responds to sensed events. When an event is sensed, a fix is made and an exception report is generated. If railcar tracking unit Clock 706 is considered accurate, then a standard fix (without TWP grid acquisition) is made. Associated with the fix is a GPS sub-frame index, and this is included in the report sent to the central station.

Central Station Process

Figure 10:
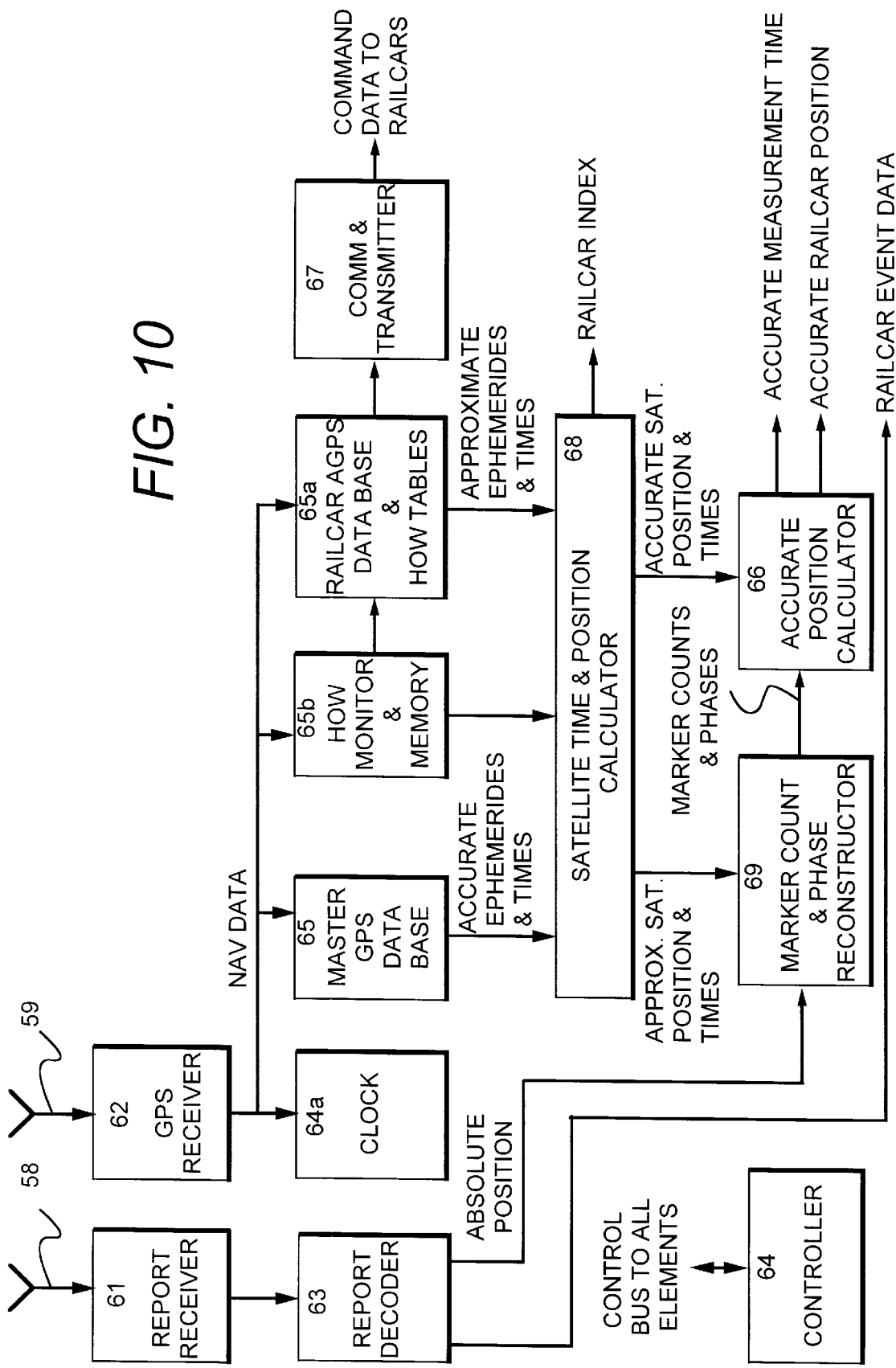
FIG. 10 is a block diagram of the central-station processing circuitry.

FIG. 10 is a block diagram of the preferred central station processing circuitry. Under control of a controller 64, railcar reports are received and demodulated by a report receiver 61 through an antenna 58 and decoded by a report decoder 63. Each report is tagged with its reception time from a clock 64a. Report decoder 63 evaluates the report type and converts each relative railcar position to an absolute railcar position using the differential decoder described earlier. For each fix, the absolute position is sent to a marker count and phase re-constructor (MCPR) 69. The GPS satellite indices, railcar index, and any HOW or sub-frame-index data, are sent to a satellite time and position calculator (STPC) 68. The STPC uses the report reception time and railcar-specific schedule data from a railcar AGPS data base 65a to determine the sub-frame index associated with the fix. The STPC then uses the sub-frame index with a railcar AGPS data base 65a to determine the frame-time offsets and satellite transmission times and positions as they were used at the railcar. Railcar AGPS data base 65a is maintained as a copy of the AGPS data base and HOW tables used at the railcar tracking unit. The reference-satellite transmission time, frame-time offsets, and satellite positions are sent to MCPR 69.

For each fix, MCPR 69 reconstructs the marker counts and phases calculated at the railcar by first converting the absolute railcar position from LLE to rectilinear coordinates. Then the propagation-delay differences are calculated by separately solving equation (7) for each propagation difference $\Delta_{1i}$. Next, each propagation-time difference and associated frame-time difference are used in equation (12) to solve for each associated marker phase and integer marker count. These are then sent to an accurate position calculator 66.

The STPC further uses the sub-frame index with an HOW monitor and memory 65b to determine accurate satellite transmission times associated with each fix. The STPC uses these times with the accurate satellite ephemerides from master GPS data base 65 to calculate accurate satellite positions. These positions and an accurate satellite transmission times are sent to accurate position calculator 66. Using the method that was used by the railcar tracking unit to calculate the approximate position, accurate position calculator 66 calculates the accurate railcar position from the marker counts and phases, accurate satellite positions, and accurate frame-time differences. Accurate position calculator 66 also calculates the accurate railcar measurement time. The railcar index, accurate position and measurement time, and relevant event data are collected as output data for each fix.

Under further control of controller 64, railcar AGPS data base 65a and master GPS data base 65 are periodically updated with new data from a GPS receiver 62.which receives the data through its antenna 59. Additionally, HOW monitor and memory 65b continually monitors the different satellite data streams from GPS receiver 62 (and possibly some remote GPS receivers) and temporarily stores the received HOW values for subsequent use with incoming railcar reports. Data from railcar AGPS data base 65a are periodically sent to the railcar tracking units via a command transmitter 67. When a railcar report includes a HOW update, the HOW table in railcar AGPS data base 65a is modified to reflect the various HOW values in use by the various railcar tracking units. If the HOW update was indicated by a sub-frame index, then HOW monitor and memory 65b is first used to determine the HOW update value. Finally, controller 64 periodically resynchronizes clock 64a to GPS time derived from GPS receiver 62.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method for identifying location of an asset to be tracked comprising the steps of:
   receiving signals transmitted from a plurality of Global Positioning System (GPS) satellites at said asset;
   detecting a GPS telmetry word preamble (TWP) and measuring data related to propagation differences between signals transmitted from GPS satellites and received at said asset;
   deriving satellite identifications for each of said GPS satellites;
   maintaining an auxiliary GPS (AGPS) data base and a GPS hand-over word (HOW) table to determine TWP start time at said asset;
   computing an estimated location of said asset from said measured data, AGPS and HOW data and a clock in approximate synchronization with GPS time;
   encoding and transmitting to a central station the satellite identifications and the computed estimated position;
   decoding, at said central station, data received from said asset; and
   calculating, at said central station, a corrected location of said asset based upon the transmitted data and data derived from at least one receiver spaced apart from said asset.

2. The method recited in claim 1 wherein the steps of encoding and decoding include, at the asset, differential encoding of an absolute coordinate value of the computed estimated location of the asset to generate a relative coordinate value which is transmitted to said central station and, at the central station, differential decoding of the relative coordinate value to generate an absolute coordinate value corresponding to the computed estimated location of the asset.

3. The method recited in claim 1 including, prior to the step of detecting a GPS telemetry word preamble, the step of determining a time window during which the GPS TWP is expected.

4. The method recited in claim 3 wherein the steps of encoding and decoding include, at the asset, differential encoding of an absolute coordinate value of the computed estimated location of the asset to generate a relative coordinate value which is transmitted to said central station and, at the central station, differential decoding of the relative coordinate value to generate an absolute coordinate value corresponding to the computed estimated location of the asset.

5. A method recited in claim 3 wherein the step of determining a time window during which the GPS TWP is expected includes:
   specifying a sub-frame index for a scheduled asset position measurement;
   predicting the associated TWP transmission time for each expected receivable satellite signal;
   estimating the associated TWP reception times at the asset;
   processing received signals for sufficient time to reliably complete detection, identification and acquisition of marker timing for four satellite signals before the TWPs are received;
   choosing, as a reference satellite signal, the satellite signal having the lowest GPS satellite index; and
   setting a TWP detection-gate time so that the correct TWP will be detected.

6. The method recited in claim 1 wherein the step of calculating, at said central location, a corrected location of said asset, is additionally based upon stored data representing geographical features.

7. A reduced order global positioning system (GPS) asset tracking system comprising:
   a tracking unit on an asset to be tracked for receiving signals from a plurality of GPS satellites, determining a time window during which a GPS telemetry word preamble (TWP) is expected, detecting the TWP and measuring data related to propagation differences between signals received from a plurality of GPS satellites deriving satellite identifications for each of said GPS satellites, maintaining an auxiliary GPS (AGPS) data base and a GPS hand-over word (HOW) table to determine a TWP start time, computing an estimated position from each of the measured, AGPS and HOW data and from a clock in approximate synchronization with GPS time, and encoding and transmitting the satellite identifications and the computed estimated position, and
   a central station adapted to decode received data from said asset and to calculate a corrected location of said asset based upon the transmitted data and data derived from at least one receiver spaced apart from said asset and adapted to receive said signals from said plurality of GPS satellites.

8. The reduced order global positioning system (GPS) asset tracking system recited in claim 7 wherein said tracking unit comprises:
   a GPS receiver for receiving signals from a plurality of GPS satellites;
   a GPS signal processor for receiving output signals from said GPS receiver and generating said satellite identifications for each of said GPS satellites;
   a command receiver for receiving command and AGPS data signals from said central station;
   a data base for storing said AGPS data, including ephemerides data, from said command receiver and maintaining a HOW, said data base being adapted to receive HOW updates from said GPS signal processor;
   a clock in approximate synchronization with GPS time;
   a satellite position calculator for receiving said satellite identifications from said GPS signal processor, a time signal from said clock, and ephemerides and HOW data from said data base and for calculating satellite positions and frame-time offsets;

an asset position calculator for receiving the calculated satellite positions and frame-time offsets and for calculating said estimated position; and a transmitter coupled to said GPS signal processor and said asset position calculator for encoding and transmitting said satellite identifications and calculated estimated position to the central station.

9. The reduced order global positioning system (GPS) asset tracking system recited in claim 8 further comprising, at the central station:

a second GPS receiver for receiving signals from a plurality of GPS satellites;

a master GPS data base adapted to be periodically updated by new data from said second GPS receiver;

an asset AGPS data base and HOW tables maintained as a copy of the AGPS data base and HOW tables used at the asset;

a satellite time and position calculator for receiving accurate ephemerides and times from the master GPS data base and approximate ephemerides and times from the asset AGPS data base and HOW tables and for calculating accurate satellite position and transmission times associated with an asset transmission;

a report receiver for receiving the encoded satellite identifications and calculated estimated position transmitted from the asset; and an asset position calculator for receiving from the satellite time and position calculator the calculated accurate satellite position and transmission times associated with an asset transmission and satellite identifications and calculated estimated position from the report receiver and for calculating an accurate asset position.

10. The reduced order global positioning system (GPS) asset tracking system recited in claim 8 and further comprising, at the asset, a differential encoder for differentially encoding an absolute coordinate value of the calculated estimated position of the asset to generate a relative coordinate value for transmission to said central station, and a differential decoder at the central station for differentially decoding the relative coordinate value transmitted by the asset to generate an absolute coordinate value corresponding to the calculated estimated position of the asset.

11. A method of determining, at the tracked asset, an approximate position of the asset comprising the steps of:

energizing a receiver for a time interval during which a Global Positioning System (GPS) telemetry word preamble (TWP) is expected;

processing a GPS signal received during said time interval to acquire code and data-bit timing for four GPS satellite signals;

recognizing a TWP starting edge in each satellite signal;

choosing a signal with a lowest GPS index as a reference signal and establishing bit or codeword edges as markers in each signal;

maintaining an auxiliary GPS (AGPS) data base and a GPS hand-over word (HOW) table to determine TWP start time at the asset;

reading a marker count from the AGPS data base during a measurement instant selected to be interger marker periods after the starting edge of the TWP in the reference signal;

measuring marker counts and phases for a measurement instant, the counts being measured with respect to the starting edge of the TWP in each satellite signal;

reading a pre-determined transmitter marker period and frame-time differences from the AGPS data base and then calculating propagation time differences;

reading a HOW time value from the reference signal and calculating the reference signal transmission time;

calculating remaining transmission times;

using the calculated transmission times with approximate ephemerides from the AGPS data base to determine satellite locations; and using the determined satellite locations to calculate the asset position.

12. The method of claim 11 wherein the measurement instants for each of the reference signal and the satellite signals are identical.

* * * * *